(12) United States Patent
Kaneko

(10) Patent No.: US 8,355,076 B2
(45) Date of Patent: *Jan. 15, 2013

(54) DIGITAL CAMERA

(75) Inventor: Shuhei Kaneko, Hino (JP)

(73) Assignees: Olympus Imaging Corp., Tokyo (JP); Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/315,835

(22) Filed: Dec. 9, 2011

(65) Prior Publication Data

US 2012/0081561 A1    Apr. 5, 2012

Related U.S. Application Data

(63) Continuation of application No. 12/274,714, filed on Nov. 20, 2008, now Pat. No. 8,098,325.

(30) Foreign Application Priority Data

Nov. 22, 2007  (JP) .................... 2007-303351
Nov. 22, 2007  (JP) .................... 2007-303352
Nov. 22, 2007  (JP) .................... 2007-303353

(51) Int. Cl.
    *H04N 5/225* (2006.01)
(52) U.S. Cl. ........................ 348/374; 348/373
(58) Field of Classification Search ............. 348/374
    See application file for complete search history.

(56) References Cited

U.S. PATENT DOCUMENTS

| | | | | |
|---|---|---|---|---|
| 6,856,766 B2 * | 2/2005 | Suzuki | ............. | 396/535 |
| 7,420,798 B2 | 9/2008 | Takahashi | | |
| 8,098,325 B2 * | 1/2012 | Kaneko et al. | ............. | 348/374 |
| 2005/0163499 A1 * | 7/2005 | Kurosawa | ............. | 396/358 |
| 2005/0270728 A1 | 12/2005 | Chen et al. | | |
| 2007/0177867 A1 * | 8/2007 | Yuge et al. | ............. | 396/448 |
| 2009/0109319 A1 * | 4/2009 | Takatsuka et al. | ............. | 348/340 |

FOREIGN PATENT DOCUMENTS

| | | |
|---|---|---|
| JP | 2002-021928 | 1/2002 |
| JP | 2003-258971 | 9/2003 |
| JP | 2004-200921 | 7/2004 |

(Continued)

OTHER PUBLICATIONS

Office Action dated Jan. 25, 2011 from corresponding Japanese Application No. 2007-303352. Office Action dated Jul. 19, 2011 from corresponding Japanese Patent Application No. 2011-130008.

*Primary Examiner* — Sinh Tran
*Assistant Examiner* — Christopher K Peterson
(74) *Attorney, Agent, or Firm* — Volpe and Koenig, P.C.

(57) ABSTRACT

A digital camera of the present invention has: an optical housing having a bending optical system for reflecting photographic object light entering along a first optical axis to a second optical axis direction perpendicular to the first optical axis to form an image on an image pickup device; a camera main body having a containing portion for containing the optical housing slidably only in the second optical axis direction and having support portions for supporting the optical housing provided on each of both sides surfaces of the containing portion across the second optical axis of the bending optical system; and a shock absorbing unit provided between an inner surface of the containing portion of the camera main body in which the support portions are not provided and an outer surface of the optical housing facing thereto.

4 Claims, 16 Drawing Sheets

FOREIGN PATENT DOCUMENTS

| | | |
|---|---|---|
| JP | 2004-317588 | 11/2004 |
| JP | 2005-306078 | 11/2005 |
| JP | 2006-040503 | 2/2006 |
| JP | 2006-080987 | 3/2006 |
| JP | 2006-221576 | 8/2006 |
| JP | 2006-293060 | 10/2006 |
| JP | 2007-034123 | 2/2007 |

* cited by examiner

DIGITAL CAMERA

CROSS REFERENCE TO RELATED APPLICATIONS

This application is a continuation of U.S. patent application Ser. No. 12/274,714, filed Nov. 20, 2008, which claims the benefit of Japanese Applications No. 2007-303351 filed in Japan on Nov. 22, 2007, No. 2007-303352 filed in Japan on Nov. 22, 2007 and No. 2007-303353 filed in Japan on Nov. 22, 2007, the contents of which are incorporated herein by their reference.

FIELD OF INVENTION

The present invention relates to a digital camera containing in a camera main body an optical housing having a bending optical system configured to bend a photographic object light entering along a first optical axis to a second optical axis direction perpendicular to the first optical axis and form an optical image on a light-receiving surface of an image pickup device arranged on the second optical axis.

BACKGROUND

Conventionally, various digital cameras have been put to practical use, which have an optical housing configured including a lens barrel unit having a plurality of optical lenses and the like, an image pickup unit including an image pickup device for subjecting an optical image of a photographic object formed by the optical lenses to photoelectric conversion, and the like.

As for these digital cameras, reduction of size of the whole device is always desired so that a user may always carry it with her/him and use it at ease at any place.

On the other hand, if a user always carries a digital camera, possibility increases that she/he, while carrying it, accidentally drops it or unexpectedly allows it to collide into a wall or the like, for example. However, since such a digital camera is an extremely precisely configured device, if external shock force is applied thereto, the external force can influence inner components, which can cause breakage or failure of the inner components.

Thus, as for conventional small size devices such as digital cameras, in order to cope with shock such as dropping, a variety of ones have been proposed configured with a floating structure such that inner components are configured to be movable in a device main body and a buffer member is provided between an outer surface of the movable inner components and an inner surface of the device main body, by Japanese Patent Application Laid-Open Publication No. 2003-258971, Japanese Patent Application Laid-Open Publication No. 2005-306078, Japanese Patent Application Laid-Open Publication No. 2006-80987, Japanese Patent Application Laid-Open Publication No. 2006-40503 and the like, for example.

In small size devices of such floating structure, when shock force by external force is applied to the exterior of the device main body, the shock force is absorbed by the buffer member being compressed.

The small size device disclosed by the above-mentioned Japanese Patent Application Laid-Open Publication No. 2003-258971 is a cellular phone or the like having a main body case which retains a camera unit and defines a contour, being configured with a buffer member provided in planes between a unit case and the main body case respectively along a direction of movement of lenses (optical axis direction; X-axis direction) and a direction perpendicular thereto (Y-axis direction) in order to alleviate shock force applied to the camera unit through the main body case.

The small size device disclosed by the above-mentioned Japanese Patent Application Laid-Open Publication No. 2005-306078 is a vehicle-mounted player apparatus installed in a dashboard in a vehicle interior, being configured with a buffer member interposed between an outer housing incorporated into the dashboard and an apparatus main body housed in the outer housing.

The small size devices disclosed by the above-mentioned Japanese Patent Application Laid-Open Publication No. 2006-80987 and the above-mentioned Japanese Patent Application Laid-Open Publication No. 2006-40503 are configured with a buffer member interposed between an outer surface of a slot portion removably housing a disk-shaped recording medium cartridge which is housed in a device main body and other inner components.

SUMMARY

A digital camera of the present invention has: an optical housing having a generally flat shape, having a bending optical system for reflecting photographic object light entering along a first optical axis to a second optical axis direction perpendicular to the first optical axis to form an optical image on an image pickup device located on the second optical axis; a camera main body having a containing portion for containing the optical housing slidably only in the second optical axis direction and having a support portion for supporting the optical housing provided on each of both side surfaces of the containing portion across the second optical axis of the bending optical system; and shock absorbing means provided between an inner surface portion of the containing portion of the camera main body in which the support portion is not provided and an outer surface portion of the flat optical housing facing the inner surface portion, the shock absorbing means absorbing shock by means of shearing force in the second optical axis direction generated between the inner surface portion of the containing portion of the camera main body and the outer surface portion of the optical housing when the optical housing is displaced by sliding in the second optical axis direction relatively in the containing portion of the camera main body due to shock.

BRIEF DESCRIPTION OF THE DRAWINGS

FIG. 1 is a perspective view showing appearance of a digital camera;

FIG. 2 is a rear view of the digital camera;

FIG. 3 is an enlarged view of essential part, schematically showing a state of arrangement of an optical housing with respect to the camera main body of the digital camera;

FIG. 4 is an exploded perspective view showing the assembly structure of the camera main body and the optical housing of the digital camera being brought out;

FIG. 5 is an exploded perspective view of shock absorbing means disposed on the front surface of the optical housing of the digital camera;

FIG. 6 is an assembly view showing a state in which the shock absorbing means is attached to the front surface of the optical housing of the digital camera;

FIG. 7 is a sectional view of the attachment region of a shock absorbing member of the optical housing of the digital camera, along VII-VII in FIG. 6;

FIG. 8 is an enlarged view of essential part, corresponding to FIG. 3;

FIG. 9 is an exploded perspective view corresponding to FIG. 4;

FIG. 10 is an exploded perspective view corresponding to FIG. 5;

FIG. 11 is an assembly view corresponding to FIG. 6;

FIG. 12 is a perspective view of the shock absorbing means;

FIG. 13 is a sectional view along XIII-XIII in FIG. 11;

FIG. 14 is an exploded perspective view showing the shock absorbing means disposed on the front surface of the optical housing of the digital camera, being exploded;

FIG. 15 is an assembly view showing a state in which the shock absorbing means is attached to the front surface of the optical housing of the digital camera;

FIG. 16 is a front view of the optical housing; and

FIG. 17 is a sectional view along XVII-XVII in FIG. 16.

DETAILED DESCRIPTION OF THE PREFERRED EMBODIMENTS

Embodiments of the present invention will be described below with reference to the drawings.

(First Embodiment)

Figure 1:
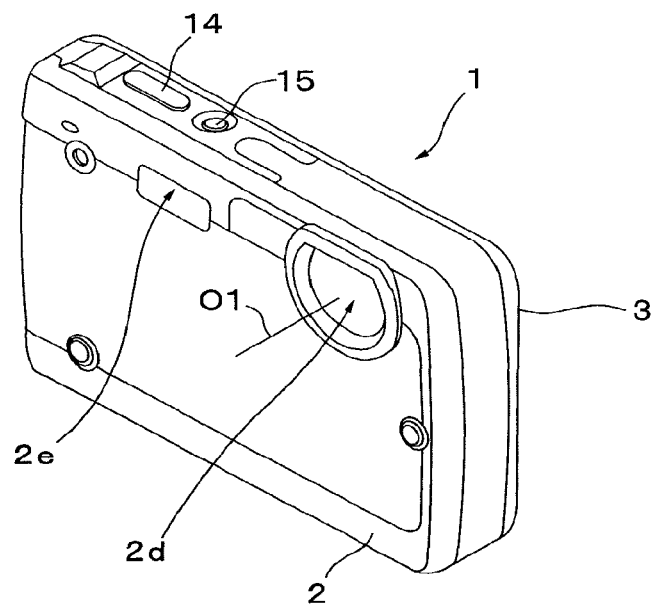
FIGS. 1 to 7 show a first embodiment of the present invention.
Figure 2:
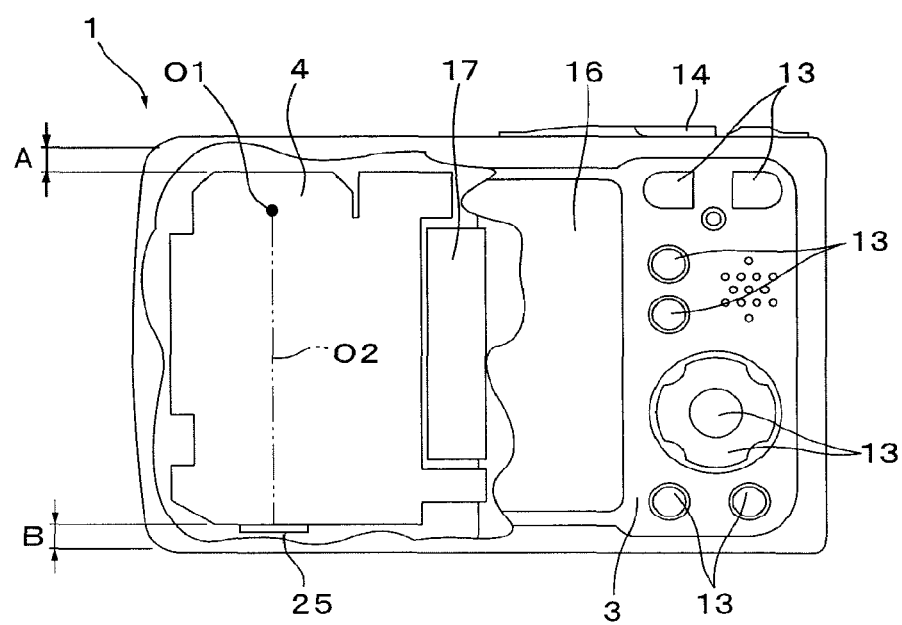

A first embodiment of the present invention is shown in FIGS. 1 to 7. In FIG. 2, part of the back side of the digital camera is torn apart to show the arrangement of an optical housing provided therein.

As shown in FIGS. 1 and 2, a digital camera 1 adopted in the present embodiment is mainly constituted by a camera main body in the form of a substantially rectangular parallelepiped box, inner components incorporated in the camera main body such as an optical housing 4, various units and electric circuits, various operation members disposed on the surface of the camera main body and coupled to the inner components, and the like.

The optical housing 4 is mainly constituted by a bending optical system configured to bend photographic object light entering along a first optical axis to a second optical axis direction perpendicular to the first optical axis and form an optical image of the photographic object on the light-receiving surface of an image pickup device arranged on the second optical axis, and a lens barrel unit including a shutter, a lens driving device and the like.

Figure 4:
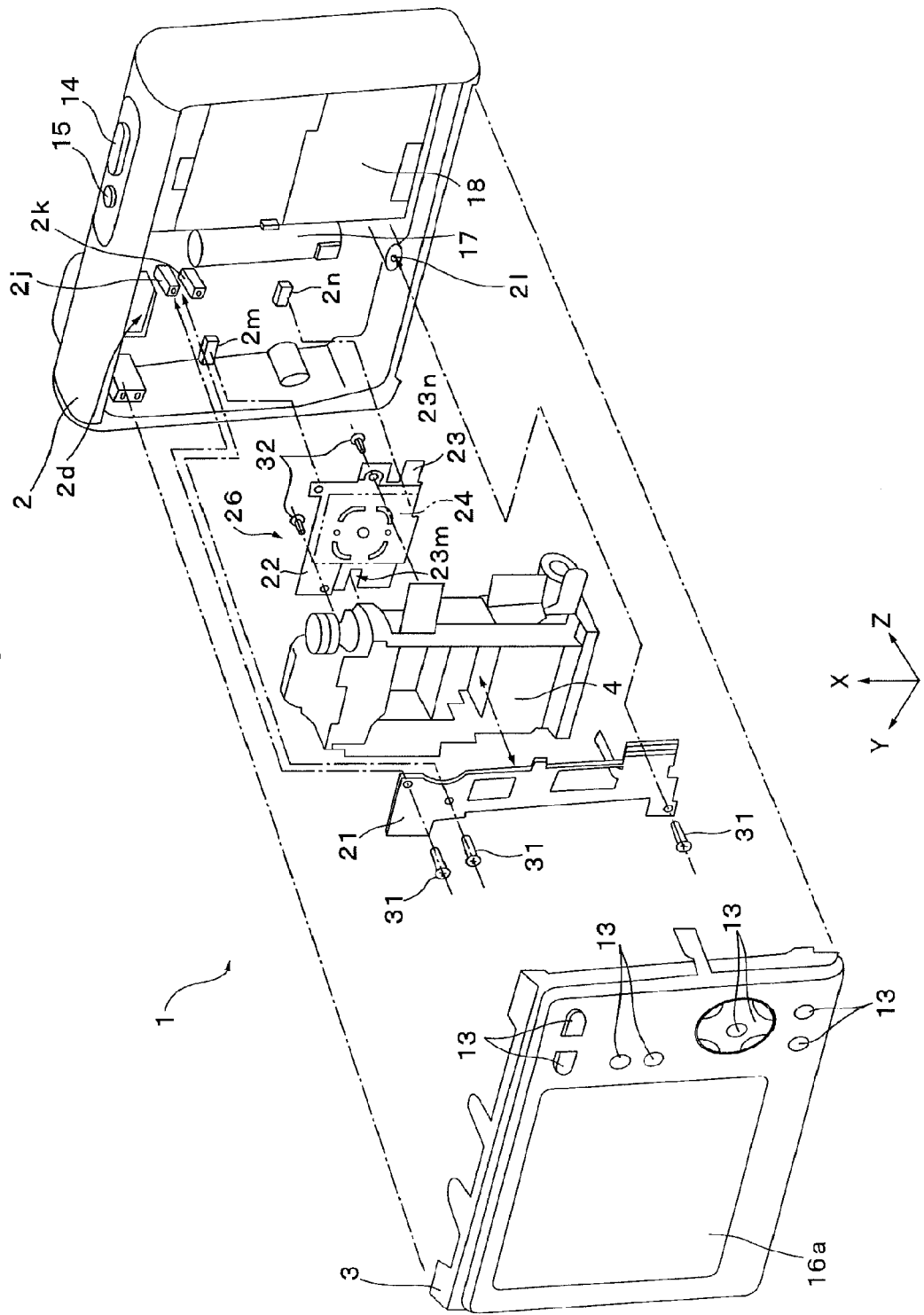

As shown in FIG. 4, the camera main body is configured in a shape of a box with a front cover member 2 formed so as to cover the front surface, both side surfaces, top surface and bottom surface and a rear cover member 3 formed so as to cover mainly the rear side being combined. The optical housing 4 is movably arranged at a predetermined region in the camera main body.

In the rear cover member 3 on the rear side of the camera main body are provided a plurality of operation members 13 which are used when various kinds of operation input to be executed at the time of photographing and reproduction are performed, such as a T button and a W button for zooming, an operation mode setting button, a photographing and reproduction operation switching button, a menu display operation button, a photographing area switching button (macro button), a strobe mode switching button, a self-timer button, and an exposure correction switching button, as well as a display portion 16 of a display device.

In a substantially middle portion of the rear cover member 3, a display window 16a opens such that display of the display portion 16 can be exposed toward the exterior. Further, on the top side of the camera main body, operation members such as a shutter button 14 and a power source operating button 15 are disposed.

In the front cover member 2, openings are formed such as a photographing window 2d for allowing light flux to enter the optical housing 4 provided in the camera main body, a light generating window 2e of a flash light generating device, and the like.

In the digital camera 1, a camera main body in a shape of a box is formed by fixing the four corner regions of both of the front cover member 2 and the rear cover member 3, being combined, to each other using coupling members such as screws.

In the inner space of the camera main body thus formed, a plurality of inner constituent units such as the optical housing 4 and the display device, and a plurality of circuit boards and electrical members and the like (for example, a main board 18 and a strobe capacitor 17) forming various electric circuits are disposed respectively in predetermined regions.

In the present embodiment, particular attention is directed to the arrangement of the optical housing 4 among the plurality of inner components.

The optical housing 4 has a generally flat shape, and has a lens barrel unit including a plurality of optical lenses constituting a bending optical system configured to bend light flux from a photographic object entering along the first optical axis O1 (see FIG. 1) through the photographing window 2d of the front cover member 2 toward a direction perpendicular to the first optical axis O1 by a reflection prism (not shown) and guide it toward an image pickup device 25 (see FIG. 3) disposed in the bottom side of the optical housing 4 on the second optical axis O2, which is the optical axis after bending, thereby forming an optical image of the photographic object on the light-receiving surface, and a lens retaining frame therefor.

Though not particularly shown, in the optical housing 4, a shutter unit, a shutter driving motor for driving the shutter unit, a focusing motor, a zooming motor, an electrical board having the image pickup device 25 (see FIG. 3) mounted and the like are mounted integrally and movably in the direction of the optical axis O2, in addition to the above-mentioned components. With regard to these component members and arrangements thereof, since these matters do not directly relate to the present invention, detailed explanation thereof is omitted, as being in accordance with the configuration of a common camera provided with an optical housing having a bending optical system.

In the camera main body of the digital camera 1, the optical housing 4 is disposed at a predetermined region in the camera main body nearer to one side as shown in FIG. 2, for example. The arrangement of the optical housing 4 in the camera main body is not limited to the example of the present embodiment; the optical housing 4 may also be disposed at the substantially middle portion in the camera main body, for example.

Figure 3:
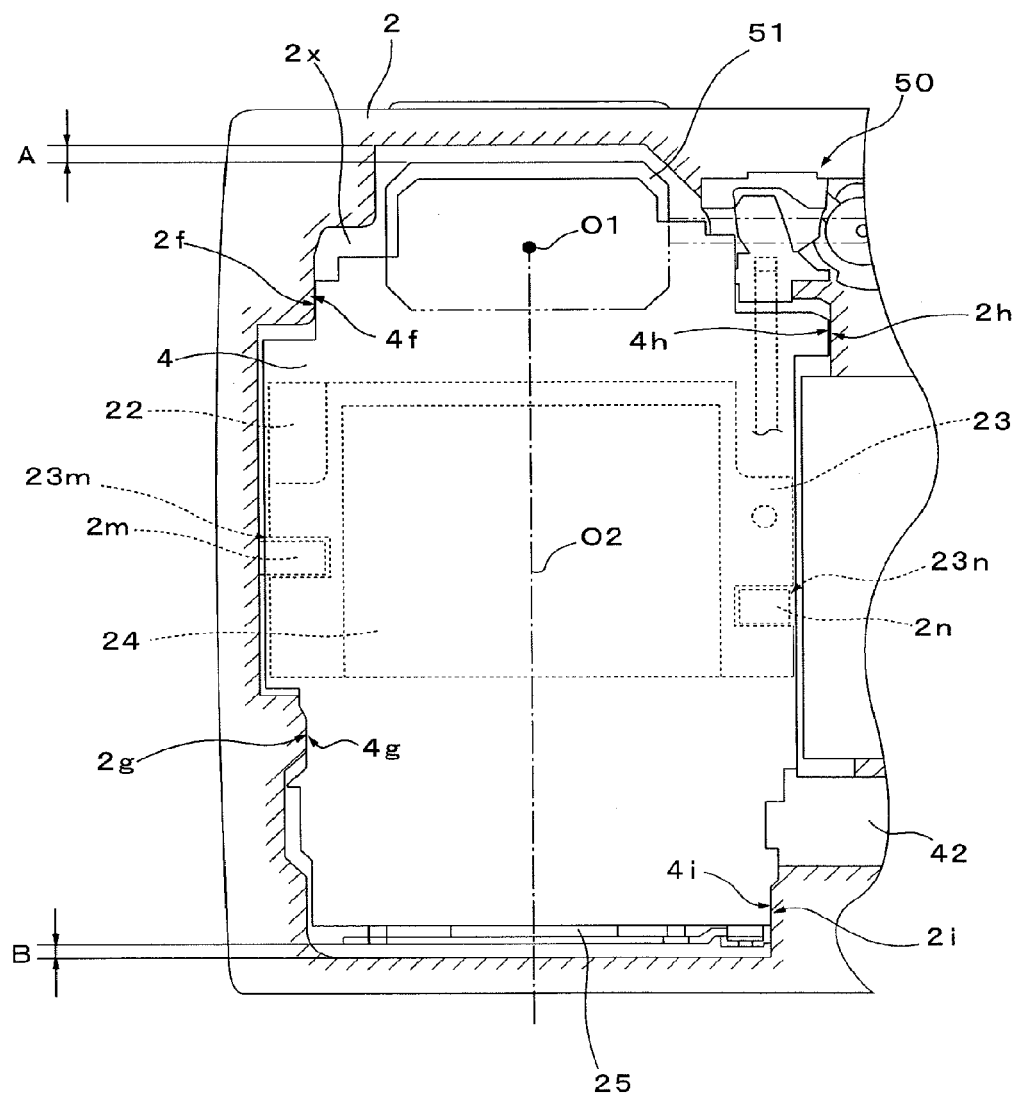

In this case, a containing portion 2x is formed in the inner surface of the front cover member 2 of the digital camera 1 so as to contain the optical housing 4 slidably only in the direction along the second optical axis O2, as shown in FIG. 3. In FIG. 3, the region inside a border indicated by oblique lines is shown to be the containing portion 2x.

The containing portion 2x is formed in the inner surface of the front cover member 2 of the digital camera 1 with stairsteps in accordance with the outer shape of the optical housing 4, with support portions 2f, 2g, 2h, 2i provided on both sides of the second optical axis O2 of the optical housing 4.

When the optical housing 4 is arranged in the containing portion 2x, regions near the four corners of the optical housing 4, that is, regions denoted by reference numerals 4f, 4g, 4h, 4i shown in FIG. 3 are in surface contact with the support portions 2f, 2g, 2h, 2i.

That is, by the four corner regions 4f, 4g, 4h, 4i of the optical housing 4 being respectively in surface contact with the support portions 2f, 2g, 2h, 2i of the containing portion 2x, the optical housing 4 is supported in the containing portion 2x of the front cover member 2 slidably only in the direction along the second optical axis O2, as well as its movement in the Y-axis direction shown in FIG. 4, which is a direction perpendicular to the second optical axis O2, being restricted.

Further, a plate form holding member 21 (see FIG. 4) is disposed on the rear-side outer surface of the optical housing 4; the plate form holding member 21 is fixed by screwing by a plurality of screws 31 (see FIG. 4) to fixing portions 2j, 2k, 2l provided on the inner side of the front cover member 2.

That is, the optical housing 4 is disposed in a form sandwiched between the inner surface of the front cover member 2 and the plate form holding member 21, being arranged in the containing portion 2x of the front cover member 2. In this way, therefore, movement of the optical housing 4 in the direction along the Z-axis shown in FIG. 4, which is a direction along the first optical axis O1, is restricted.

Figure 5:
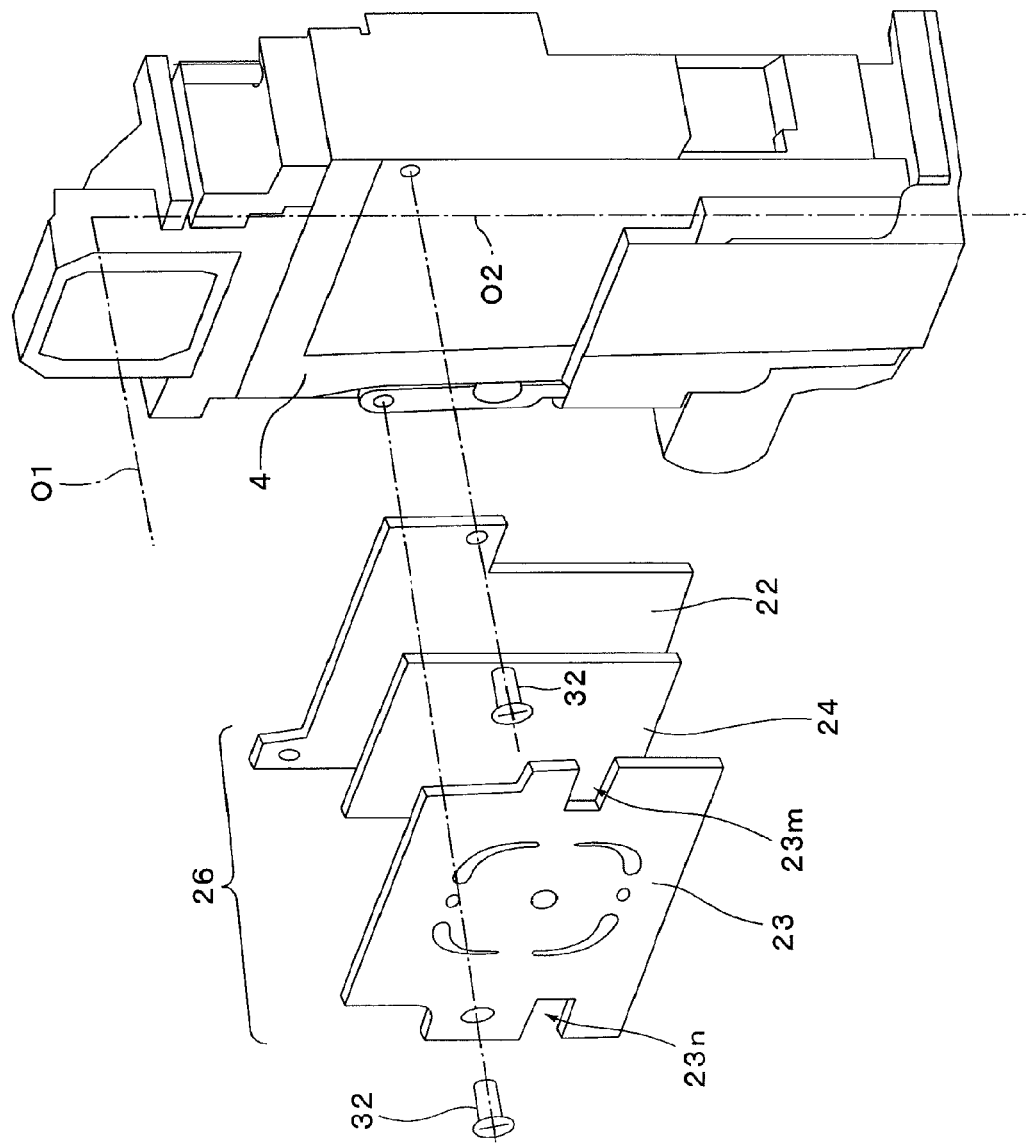
Figure 6:
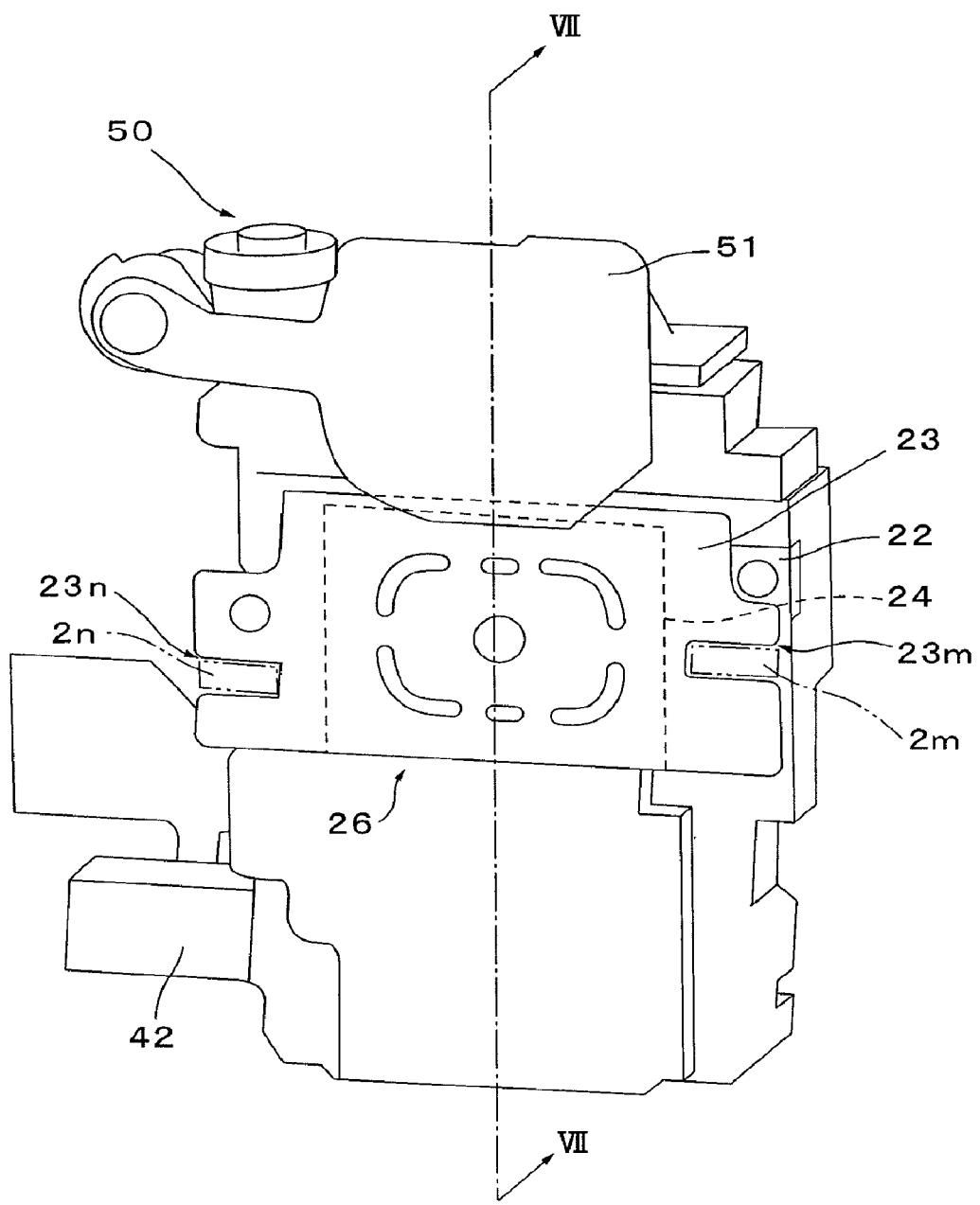
Figure 7:
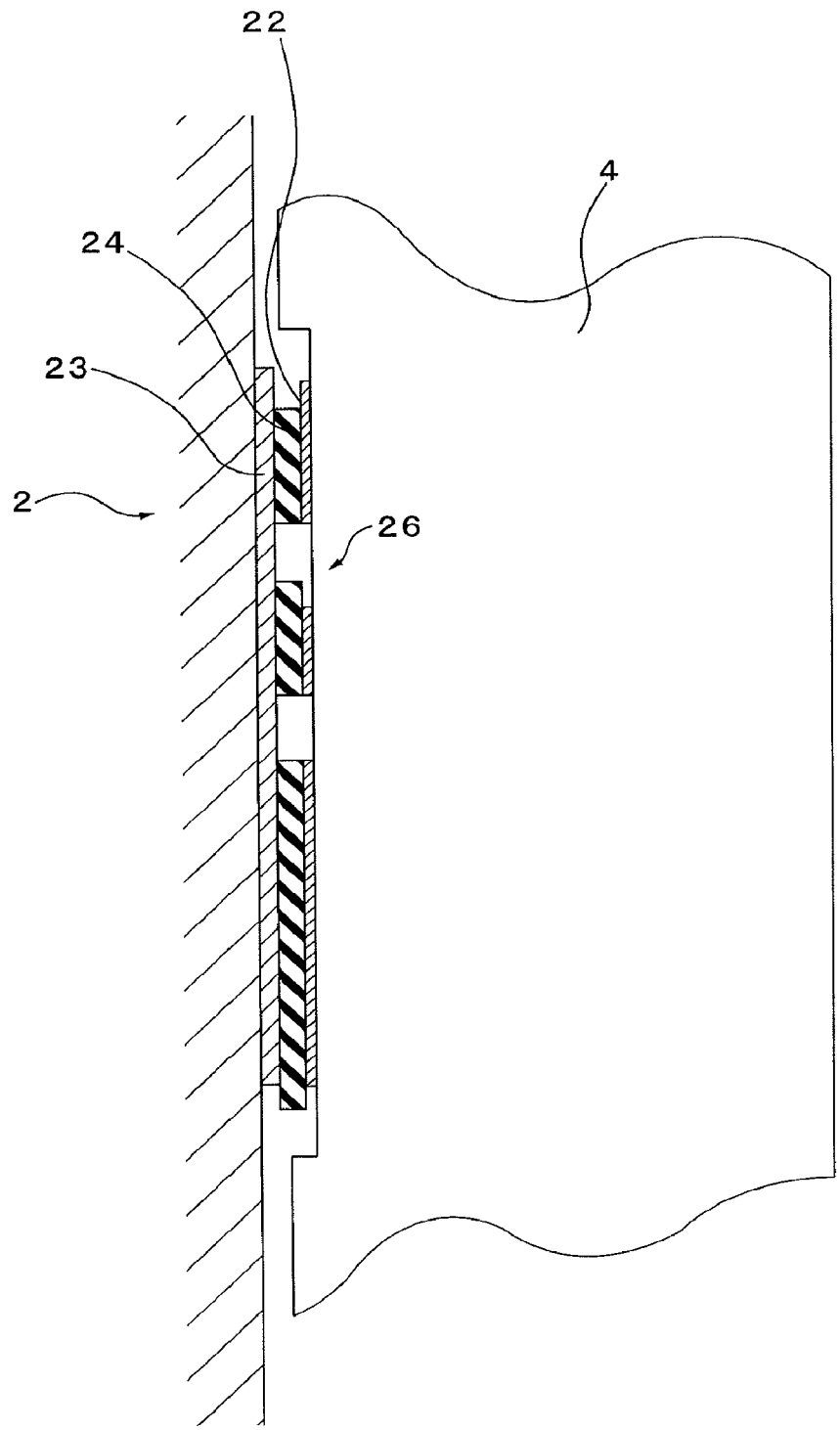

Meanwhile, shock absorbing means 26 is disposed on the front side of the optical housing 4. As shown in FIGS. 4 and 5, the shock absorbing means 26 is constituted of a shock absorbing member 24 made of a resilient butyl-based rubber member or the like, formed in the shape of a thin flat plate, and a first thin plate 22 and second thin plate 23 made of metal, resin or the like sandwiching both sides of the shock absorbing member 24.

When the optical housing 4 is arranged in the containing portion 2x of the camera main body of the digital camera 1, the shock absorbing means 26 is arranged between the outer surface (front surface) of the optical housing 4 and the containing portion 2x of the inner surface of the front cover member 2 facing thereto. In addition, the first thin plate 22 on one side is screwed onto the front surface of the optical housing 4 by means of screws 32 (see FIG. 4) between the optical housing 4 and the front cover member 2. Further, the second thin plate 23 on the other side is fixed to a predetermined region of the containing portion 2x (camera main body side) of the front cover member 2.

Specifically, the second thin plate 23 has notch portions 23m, 23n formed in both side edges which face each other across the second optical axis O2 when the shock absorbing means 26 is mounted to the optical housing 4. In correspondence thereto, engagement protrusions 2m, 2n are formed on the inner side of the containing portion 2x of the front cover member 2 at the regions which face the notch portions 23m, 23n when the optical housing 4 having the shock absorbing means 26 mounted is contained in the containing portion 2x (camera main body side) of the front cover member 2.

In this way, when the optical housing 4 to which the shock absorbing means 26 is mounted is contained in the containing portion 2x of the front cover member 2, each of the notch portions 23m, 23n of the second thin plate 23 is respectively engaged with the engagement protrusions 2m, 2n of the containing portion 2x. In this way, the second thin plate 23 is fixed to the front cover member 2 with its movement in the direction along the second optical axis O2 (X-axis direction of FIG. 4) being restricted. The shock absorbing member 24 is fixed by bonding with adhesive or the like to the substantially middle portion between both thin plates 22, 23.

As shown in FIG. 5, a plurality of hole portions are formed near the substantially middle portion of the second thin plate 23. The hole portions are for letting out surplus adhesive or the like at the time of bonding fixation between the shock absorbing member 24 and the second thin plate 23.

The shock absorbing means 26 thus configured is sandwiched between the inner surface of the front cover member 2 (in the containing portion 2x) and the front surface (at least one outer surface) of the optical housing 4.

In this way, therefore, when the optical housing 4 is displaced by sliding in the direction along the second optical axis O2 relatively in the camera main body of the digital camera 1 by shock, for example, the shock absorbing means 26 can absorb the shock by shearing force in the second optical axis O2 direction generated between the inner surface portion of the camera main body, that is, the inner surface of the containing portion 2x of the front cover member 2 and the outer surface portion of the optical housing 4, that is, the front surface of the optical housing 4.

In other words, since the shock absorbing member 24 is made of a resilient rubber-based member as mentioned above, when external force (including the component force in the X-axis direction) in the shear direction, that is, the direction along the second optical axis O2 of the optical housing 4 (the direction along the X-axis shown in FIG. 4; the direction in which the optical lenses move) is applied, the optical housing 4 is moved to some extent in the same direction (the direction along the second optical axis O2, that is, the direction along the X-axis) relatively to the camera main body (the front cover member 2) by shear deformation of the shock absorbing member 24.

In this case, in order to allow movement of the optical housing 4 in the direction along the second optical axis O2 (the direction along the X-axis) thereby to avoid interference of the optical housing 4 with the camera main body, the arrangement of the optical housing 4 with respect to the inner surface of the front cover member 2 is defined such that some amount of gap space is formed in the predetermined regions between both ends of the optical housing 4 in the direction of movement (the second optical axis direction) and the inner surface of the camera main body, that is, in the regions indicated by reference numerals A and B in FIGS. 2 and 3.

The gap spaces A and B are set by considering various factors such as the resilient force determined by the material of the shock absorbing member 24, the shock absorbing ability in the shear direction, the weight of the optical housing 4, the weight of the digital camera 1 itself, and the amount of external force applied by shock or the like.

Here, as for the gap spaces A and B, sufficient length should be secured when the amount of movement of the optical housing 4 is considered, for example; however, if an unnecessarily large length of gap is secured by assuming a very large amount of shock force, for example, the requirement for reduction of the size of the camera main body cannot be met. Therefore, in designing, in consideration of reduction of the size of the device as well, the length of the gap spaces A and B in the order of about 1 mm, respectively, is secured, for example, in a small size camera or the like shown as an example in the present embodiment.

The shock absorbing means 26 may be arranged between the rear side of the optical housing 4 and the plate form holding member 21, or may be arranged on both front surface and rear surface of the optical housing 4.

As described above, according to the present embodiment, since the optical housing 4 is disposed so as to be movable only in the direction along the direction of movement of the optical lenses (the direction along the second optical axis O2; the X-axis direction in FIG. 4) with respect to the camera main body and the resilient shock absorbing means 26 is disposed between one surface of the optical housing 4 and the inner surface of the camera main body, displacement in the shear direction generated between one surface of the optical housing 4 and one surface in the camera main body at the time of relative displacement of the optical housing 4 in the camera main body can be absorbed by the shock absorbing means 26. In this way, therefore, external force applied by shock from the exterior and the like to the camera main body can be absorbed and attenuated so that the optical housing 4 in the camera main body can be protected.

In addition, the shock absorbing means 26 can absorb displacement in the shear direction so that it can be formed in the shape of a thinner plate and therefore can contribute to reduction in the size of the device while providing sufficient shock absorbing properties. Further, the shock absorbing means 26 is disposed not in the direction of movement of the optical lenses, where space for movement is required, but is disposed in a plane along the direction of movement of the optical lenses; therefore, it can contribute to reduction in the size of the device.

(Second Embodiment)

A second embodiment of the present invention will be described based on FIGS. 8 to 13. While the shock absorbing means 26 shown in the above-described first embodiment has a configuration in which the shock absorbing member 24 is sandwiched by the first thin plate 22 and the second thin plate 23, shock absorbing means 26' adopted in the present embodiment is constituted of the second thin plate 23 and the shock absorbing member 24 with the first thin plate 22 eliminated, thereby achieving simplification of the structure.

Since the present embodiment is application of other shock absorbing means 26' in place of the shock absorbing means 26 in the first embodiment, the configuration is similar to the first embodiment in other respects. Accordingly, components other than the shock absorbing means 26' are denoted by the same reference numerals as the first embodiment and explanation thereof is omitted. The materials of the shock absorbing member 24 and the second thin plate 23 (hereinafter referred to simply as "thin plate 23") are the same as the first embodiment.

One surface of the shock absorbing member 24 is fixed by bonding to the outer surface portion of the front side of the optical housing 4, and the other surface is fixed by bonding to one surface of the thin plate 23. In this case, the plate thickness of the shock absorbing member 24, the size of the bonding areas and the like are set to proper values depending on the weight of the optical housing 4, shock acceleration to be applied and the like. In a small size camera or the like such as shown as an example in the present embodiment, the plate thickness of the shock absorbing member 24 is in the order of about 0.5 to 1.0 mm, for example.

The thin plate 23 is fixed to a predetermined region in the inner surface portion of the containing portion 2x of the front cover member 2 of the camera main body. Specifically, as shown in FIGS. 10, 11 and the like, notch portions 23m, 23n are formed in both side edges of the thin plate 23 which face each other across the second optical axis O2 when the shock absorbing means 26' is mounted to the optical housing 4.

Figure 9:
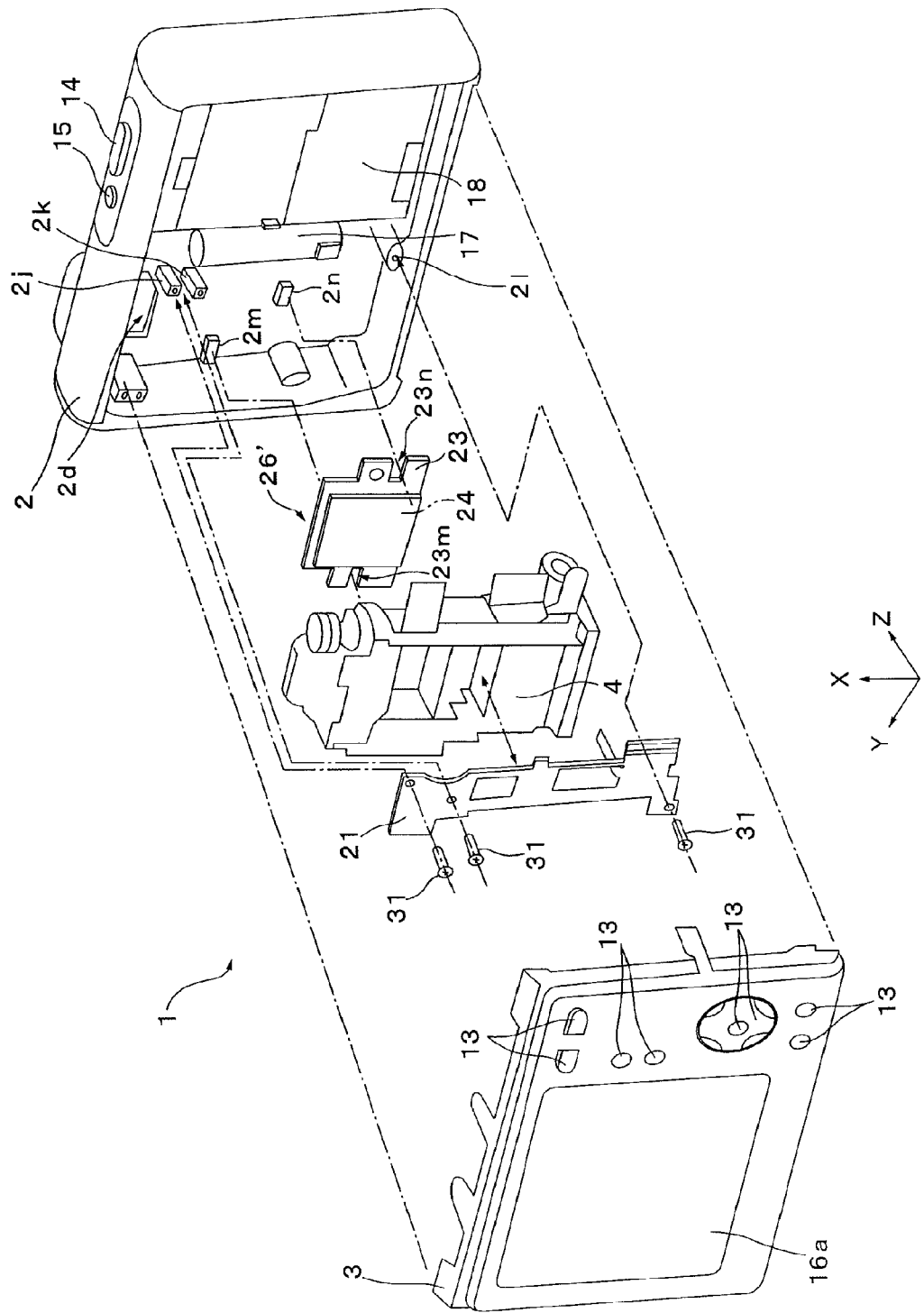

In correspondence therewith, engagement protrusions 2m, 2n are formed as shown in FIG. 9 at those regions of the inner side of the containing portion 2x of the front cover member 2 which face the notch portions 23m, 23n when the optical housing 4 to which the shock absorbing means 26' is mounted is contained in the containing portion 2x (camera main body side) of the front cover member 2.

Thus, when the optical housing 4 to which the shock absorbing means 26' is mounted is contained in the containing portion 2x of the front cover member 2, the notch portions 23m, 23n of the thin plate 23 are respectively engaged with the engagement protrusions 2m, 2n of the containing portion 2x. In this way, the thin plate 23 is fixed to the front cover member 2 with its movement in the direction along the second optical axis O2 (the X-axis direction in FIG. 9) being restricted.

Figure 10:
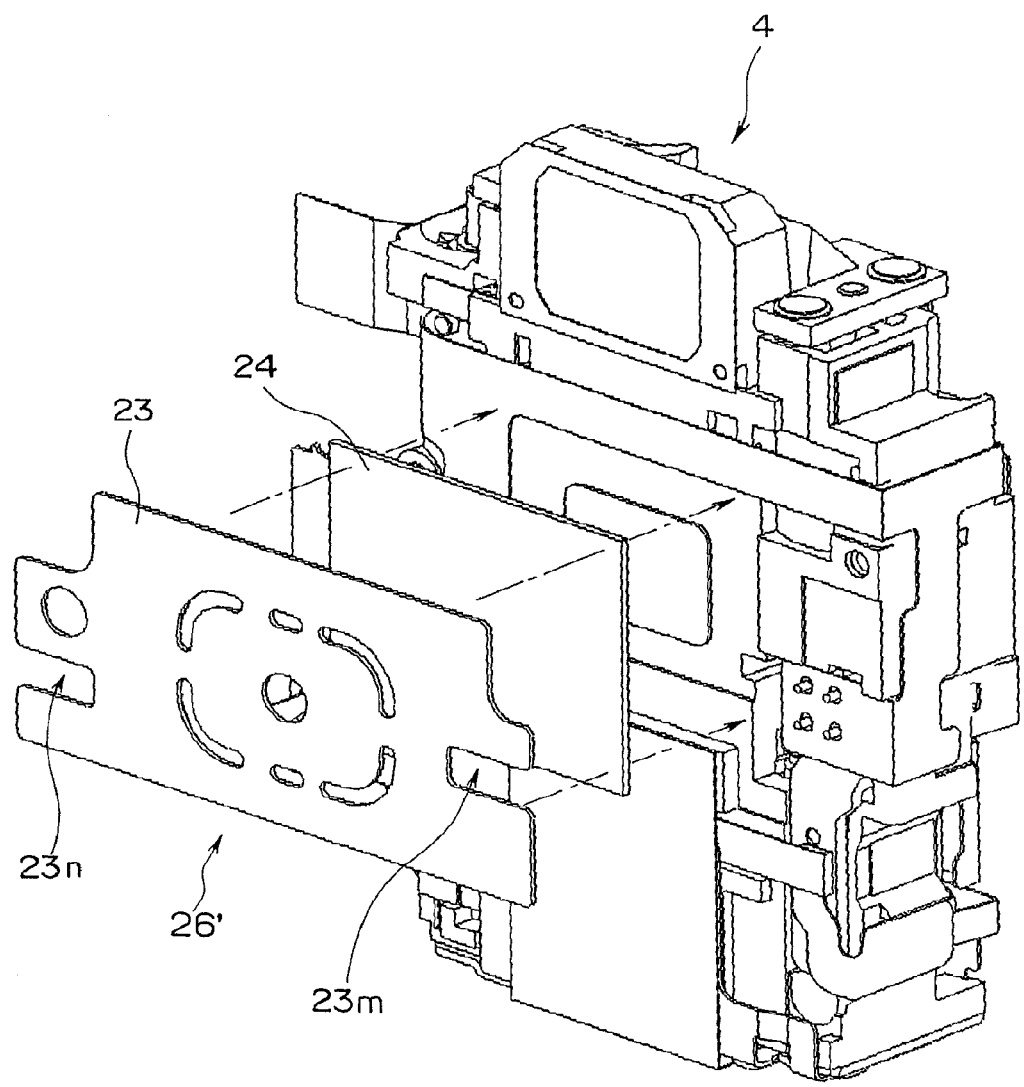
Figure 11:
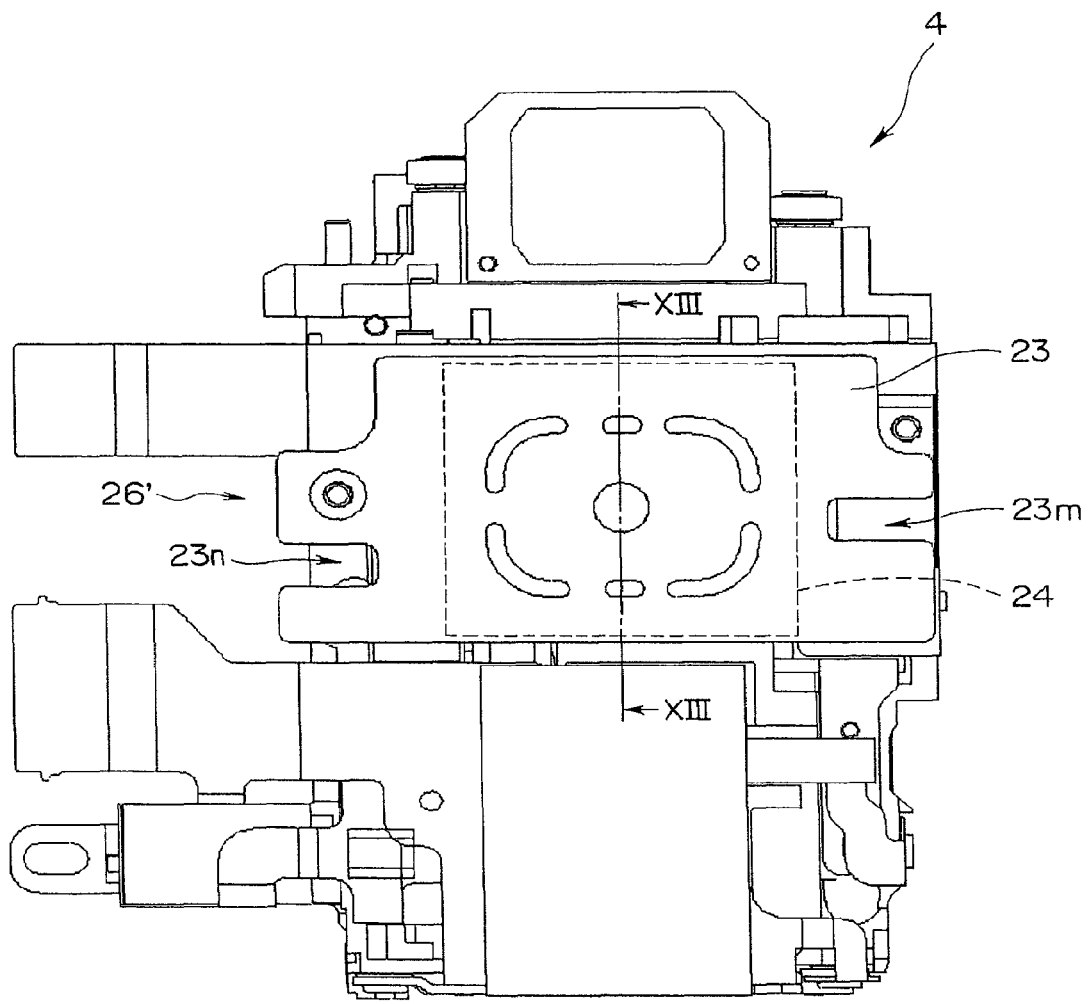
Figure 12:
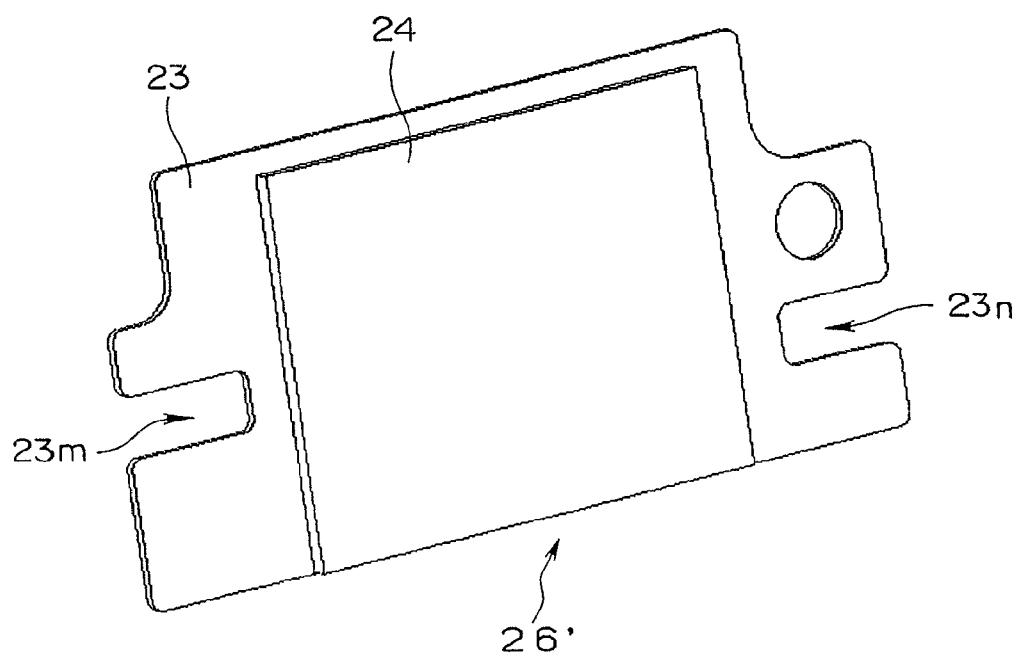
Figure 13:
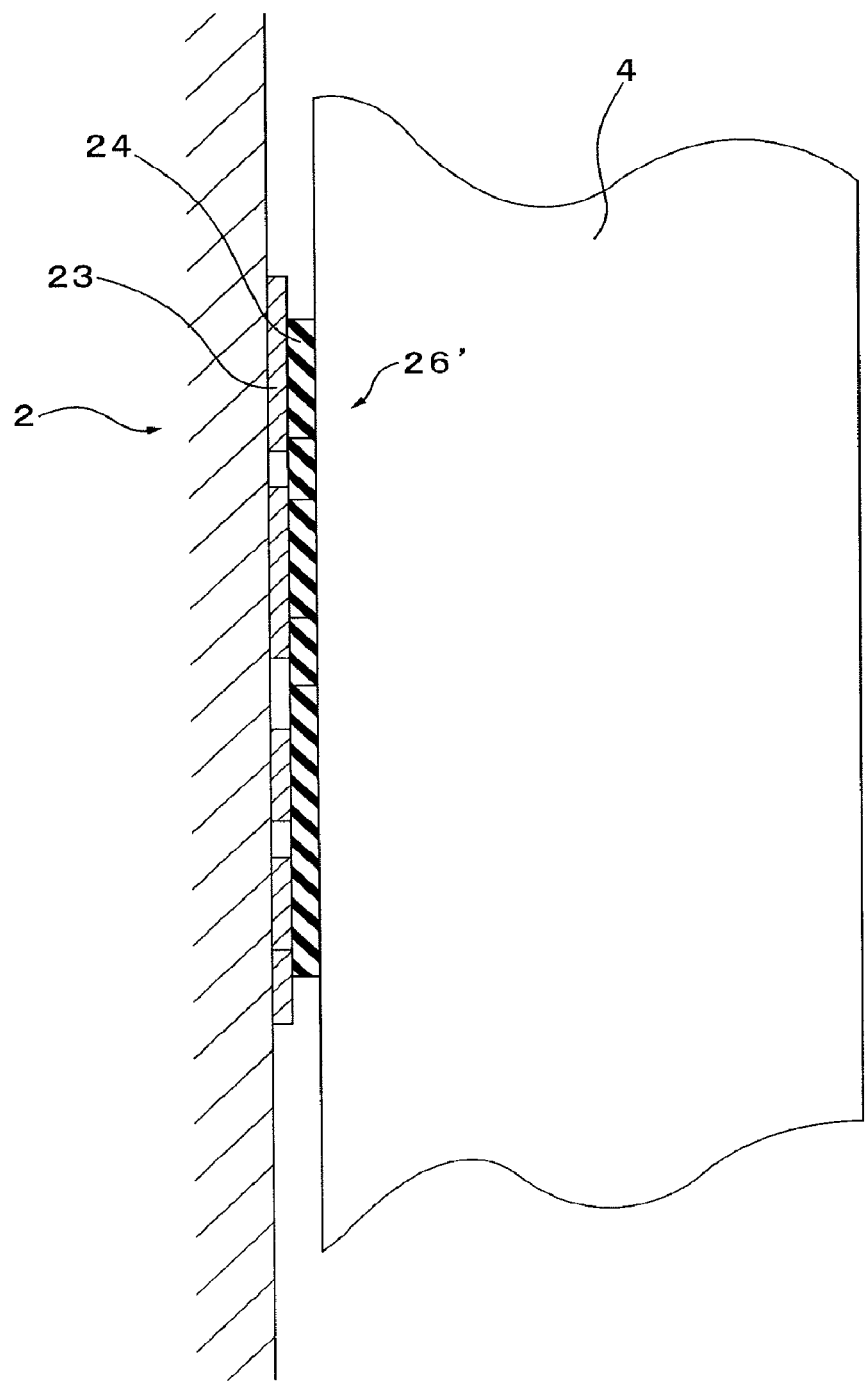

As shown in FIG. 10 and the like, a plurality of hole portions are formed near the substantially middle portion of the thin plate 23. The hole portions are provided for letting out surplus adhesive or the like at the time of bonding fixation between the shock absorbing member 24 and the thin plate 23.

The shock absorbing means 26' thus configured is sandwiched between the inner surface (in the containing portion 2x) of the front cover member 2 and the front surface (at least one outer surface) of the optical housing 4.

In this way, therefore, when the optical housing 4 is displaced by sliding in the direction along the second optical axis O2 relatively in the camera main body of the camera 1 by shock, for example, the shock absorbing means 26' can absorb the shock by shearing force in the second optical axis O2 direction generated between the inner surface portion of the camera main body, that is, the inner surface of the containing portion 2x of the front cover member 2 and the outer surface portion of the optical housing 4, that is, the front surface of the optical housing 4.

In other words, since the shock absorbing member 24 is made of a resilient rubber-based member as mentioned above, when external force (including the component force in the X-axis direction) in the shear direction, that is, the direction along the second optical axis O2 of the optical housing 4 (the direction along the X-axis shown in FIG. 9; the direction in which the optical lenses move) is applied, the optical housing 4 can be moved to some extent in the same direction (the direction along the second optical axis O2, that is, the direction along the X-axis) relatively to the camera main body (the front cover member 2) by shear deformation of the shock absorbing member 24.

Figure 8:
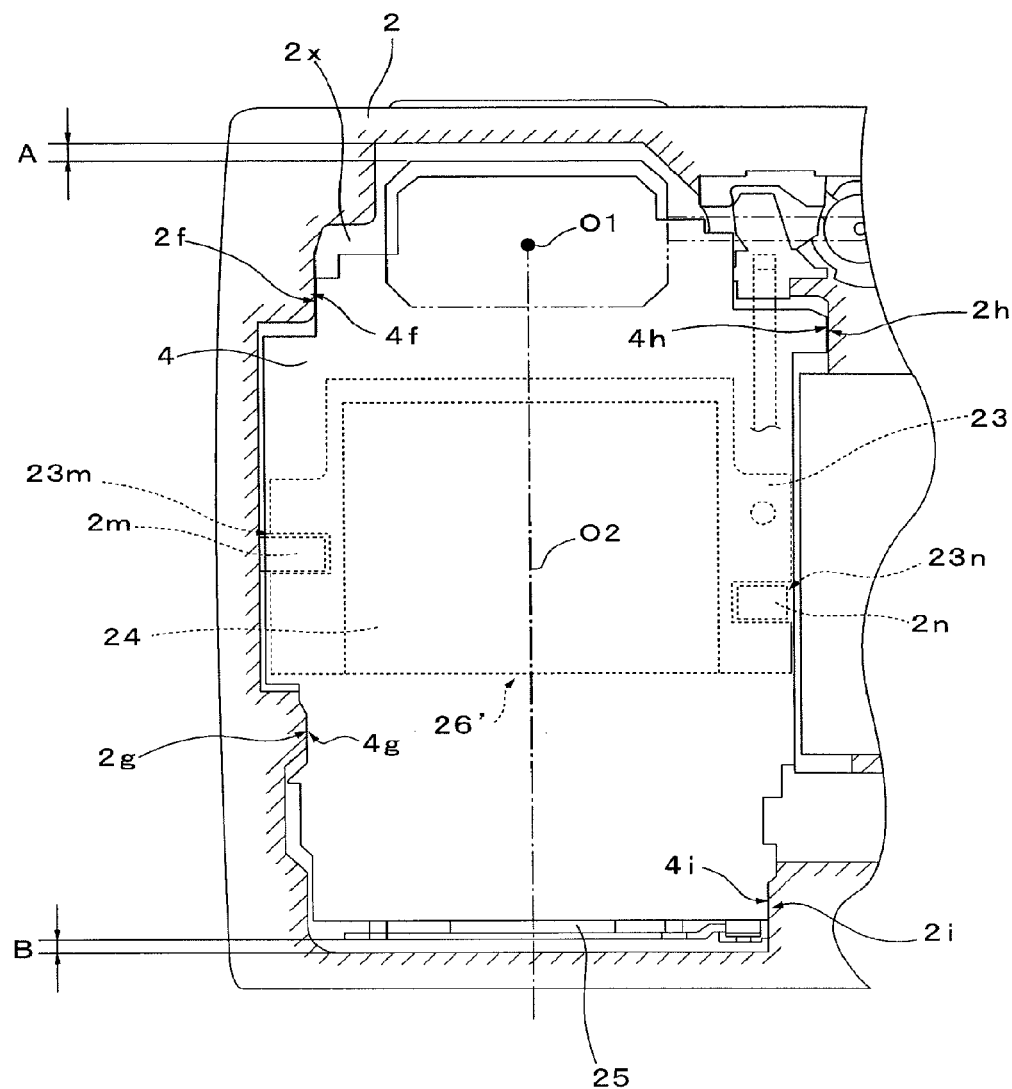
FIGS. 8 to 13 show a second embodiment of the present invention.

In this case, in order to allow movement of the optical housing 4 in the direction along the second optical axis O2 (the direction along the X-axis) thereby to avoid interference of the optical housing 4 with the camera main body, the arrangement of the optical housing 4 with respect to the inner surface of the front cover member 2 is defined such that some amount of gap space is formed in the predetermined regions between both ends of the optical housing 4 in the direction of movement (the second optical axis direction) and the inner surface of the camera main body, that is, in the regions indicated by reference numerals A and B in FIG. 8.

The gap spaces A and B are set depending on various factors such as the resilient force determined by the material of the shock absorbing member 24, the shock absorbing ability in the shear direction, the weight of the optical housing 4, the weight of the camera 1 itself, and the amount of external force applied by shock or the like.

Here, as for the gap spaces A and B, sufficient length should be secured when the amount of movement of the optical housing 4 is considered, for example; however, if an unnecessarily large length of gap is secured by assuming a very large amount of shock force, for example, the requirement for reduction of the size of the camera main body cannot be met.

Therefore, in designing, in consideration of reduction of the size of the device as well, the length of the gap spaces A and B in the order of about 1 mm, respectively, is secured, for example, in a small size camera or the like shown as an example in the present embodiment.

An aspect is also conceivable in which the shock absorbing means 26' is arranged between the rear side of the optical housing 4 and the plate form holding member 21. Therefore, an exemplary configuration is also possible in which both of the exemplary configuration of the present embodiment, in which the shock absorbing means 26' is disposed on the front side of the optical housing 4, and the aspect in which the shock absorbing means 26' is provided on the rear side are applied.

As described above, according to the present embodiment, since the shock absorbing means 26' is constituted of two parts, that is, the shock absorbing member 24 and the thin plate 23, simplification of the configuration can be achieved as compared with the shock absorbing means 26 shown in the first embodiment. The effects and advantages in other respects are similar to the first embodiment.

(Third Embodiment)

A third embodiment of the present invention is shown in FIGS. 14 to 17. The present embodiment is a variation of the second embodiment described above. While the shock absorbing means 26' shown in the second embodiment described above has its one surface fixed by bonding to the outer surface portion of the front side of the optical housing 4, shock absorbing means 26" adopted in the present embodiment is positioned by fitting the shock absorbing member 24 in a frame portion 4f formed on the outer surface portion of the optical housing 4.

In the present embodiment, a frame portion 4f is formed on the outer surface portion of the optical housing 4 and positioning can be performed by fitting the shock absorbing member 24 in the frame portion 4f, so the position alignment at the time of mounting is facilitated and improvement of the efficiency of the assembly work can be achieved. Since the present embodiment is a variation of the second embodiment, components in common with those in the second embodiment are denoted by the same reference numerals and explanation thereof is omitted. The materials of the shock absorbing member 24 and the thin plate 23 are the same as the second embodiment.

Specifically, as shown in FIGS. 14 to 17, a frame portion 4f in a rectangular shape is formed on one surface of the optical housing 4 which is parallel to the direction along the second optical axis O2, that is, the flat surface on the front side, and a concave portion 4e is formed inside the frame portion 4f.

In addition, the shock absorbing means 26" is constituted of the thin plate 23 and the shock absorbing member 24 one surface of which is fixed by bonding to the thin plate 23, in the same way as the second embodiment. The shock absorbing member 24 is formed in a shape to be fitted in the concave portion 4e formed inside the frame portion 4f. In this case, one surface of the shock absorbing member 24 is bonded to the flat surface portion at the bottom of the concave portion 4e through a bonding member such as a double-sided tape or adhesive. In this way, therefore, the shock absorbing member 24 is fixed to the optical housing 4 with its movement in the direction along the second optical axis O2 (the X-axis direction in FIG. 9) being restricted by the inner wall surface of the frame portion 4f.

The plate thickness of the shock absorbing member 24 is formed to be greater than the depth of the concave portion 4e. Thus, when the shock absorbing member 24 is mounted in the concave portion 4e, the plate thickness of the shock absorbing member 24 slightly protrudes from the end surface of the concave portion 4e. In this case, the plate thickness of the shock absorbing member 24, the size of the bonding areas, the amount of protrusion from the end surface of the frame portion 4f and the like are determined to be of proper values depending on the weight of the optical housing 4, shock acceleration to be applied and the like. In a small size camera or the like such as shown as an example in the present embodiment, the plate thickness of the shock absorbing member 24 is in the order of about 0.5 to 1.0 mm, for example. The amount of protrusion of the shock absorbing member 24 from the end surface of the frame portion 4f is in the order of about 0.2 to 0.3 mm, for example.

Figure 14:
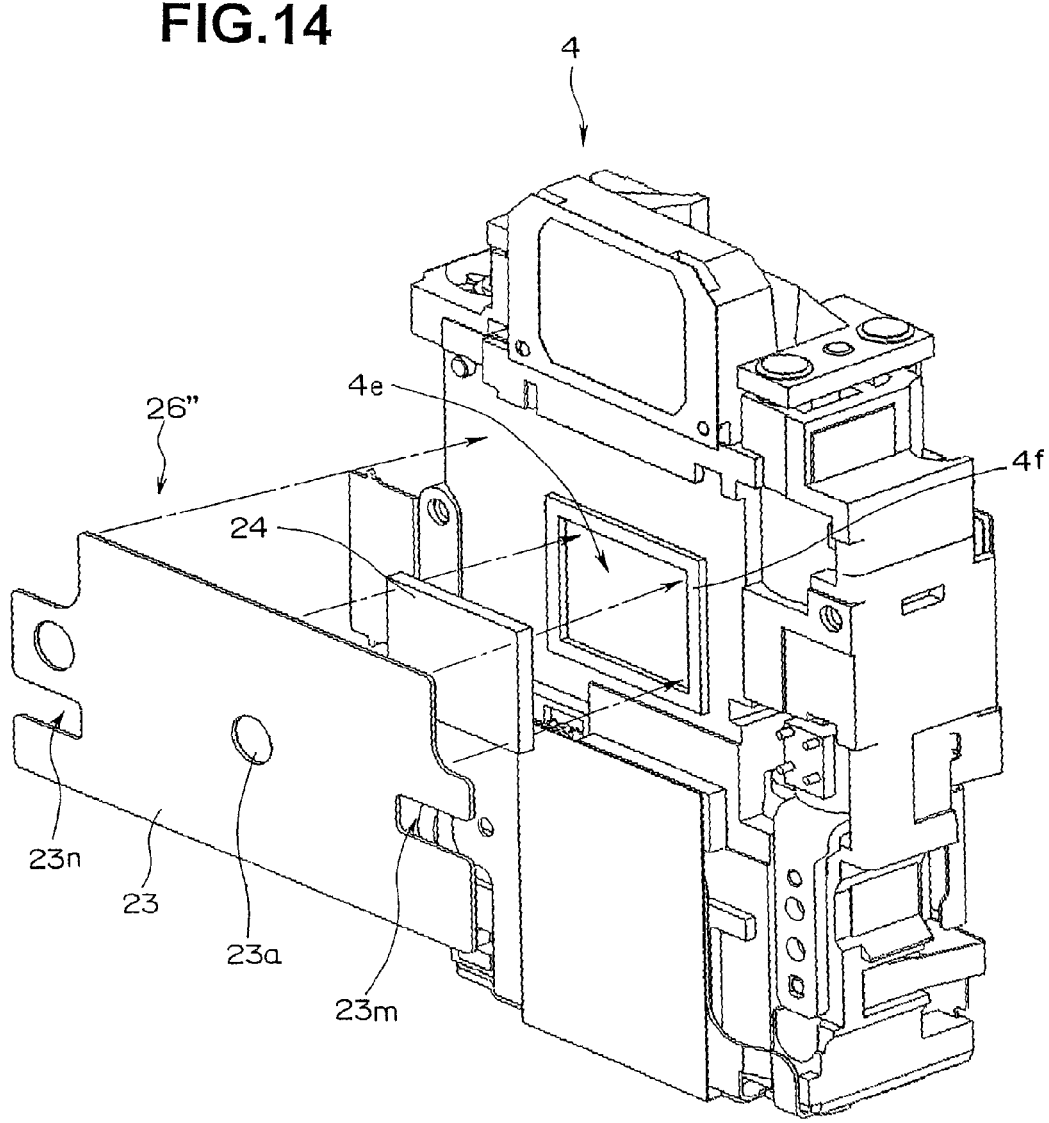
FIGS. 14 to 17 show a third embodiment of the present invention.
Figure 15:
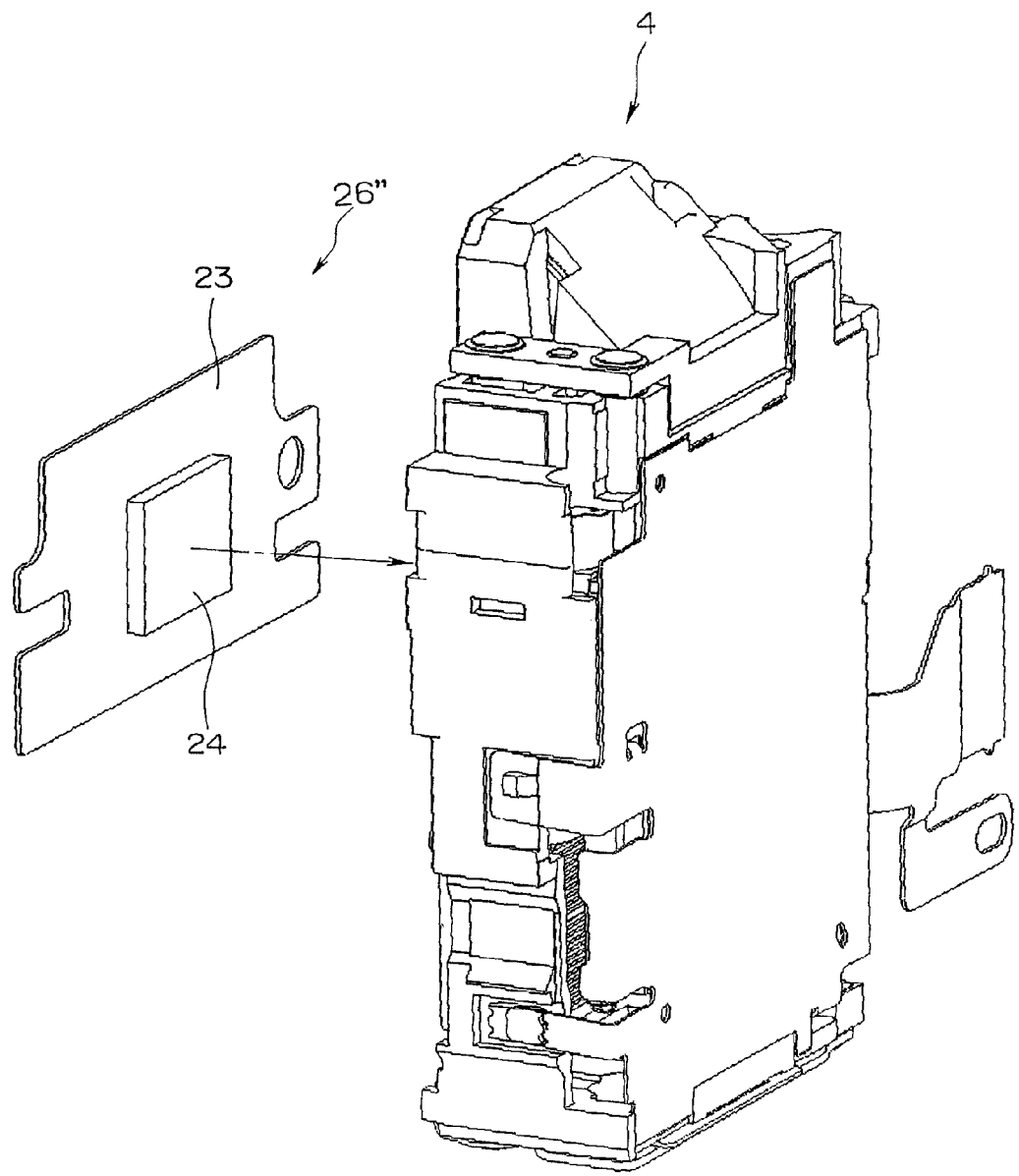
Figure 16:
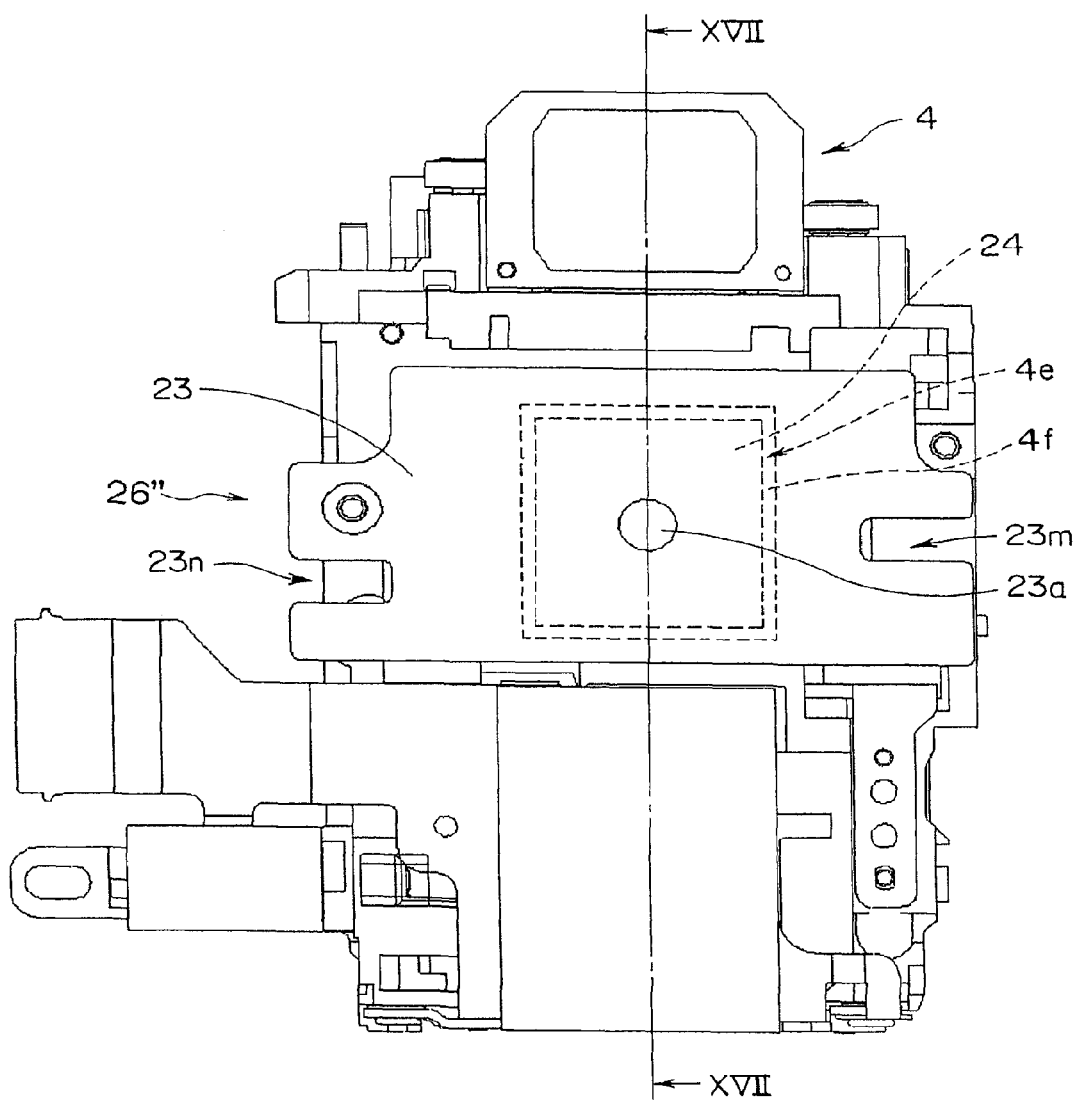
Figure 17:
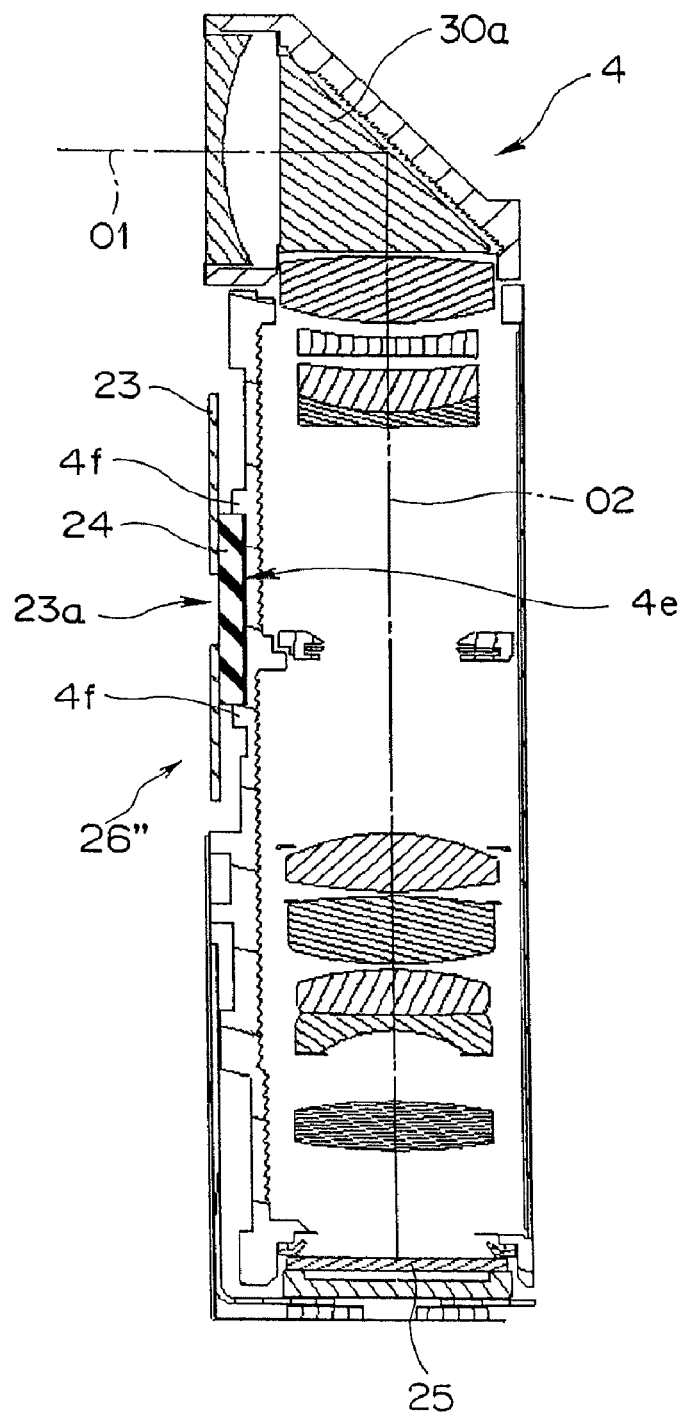

In the same way, one surface of the thin plate 23 is bonded to the other surface of the shock absorbing member 24 with a double-sided tape, adhesive or the like, for example. As shown in FIG. 14 and the like, a hole portion 23a is provided as a perforation near the substantially middle portion of the thin plate 23. The hole portion 23a is for letting out surplus adhesive or the like at the time of bonding fixation between the shock absorbing member 24 and the thin plate 23.

In addition, notch portions 23m, 23n are formed in both side edges of the thin plate 23 which face each other across the second optical axis O2 when the shock absorbing means 26" is arranged in a predetermined position of the optical housing 4. In correspondence therewith, engagement protrusions 2m, 2n are formed at those regions on the inner side of the containing portion 2x of the front cover member 2 which face the respective notch portions 23m, 23n of the thin plate 23 when the optical housing 4 to which the shock absorbing means 26" is mounted is contained in the front cover member 2 (camera main body side) of the camera 1.

Thus, when the optical housing 4 to which the shock absorbing means 26" is mounted is contained in the containing portion 2x of the front cover member 2, the notch portions 23m, 23n of the thin plate 23 are respectively engaged with the engagement protrusions 2m, 2n of the containing portion 2x. In this way, therefore, the thin plate 23 is fixed to the front cover member 2 with its movement in the direction along the second optical axis O2 (the X-axis direction in FIG. 9) being restricted.

In addition, when the optical housing 4 is arranged in the containing portion 2x of the camera main body of the camera 1, the shock absorbing means 26" is arranged between the inner surface portion of the containing portion 2x of the front cover member 2 and the concave portion 4e of the optical housing 4 facing the inner surface portion, and the shock absorbing member 24 is fitted in the concave portion 4e to be positioned. In this way, therefore, when the optical housing 4 is displaced by sliding in the direction along the second optical axis O2 relatively in the camera main body of the camera 1 by shock, for example, the shock absorbing means 26" can absorb the shock by shearing force in the second optical axis O2 direction generated between the inner surface portion of the camera main body, that is, the inner surface of the containing portion 2x of the front cover member 2 and the front surface of the optical housing 4.

In other words, since the shock absorbing member 24 is made of a resilient rubber-based member as mentioned above, when external force (including the component force in the X-axis direction) in the shear direction, that is, the direction along the second optical axis O2 of the optical housing 4 (the direction along the X-axis shown in FIG. 9; the direction in which the optical lenses move) is applied, the optical housing 4 can be moved to some extent in the same direction (the direction along the second optical axis O2, that is, the direction along the X-axis) relatively to the camera main body (the front cover member 2) by shear deformation of the shock absorbing member 24.

In this case, since the shock absorbing member 24 is arranged so as to be mounted in the concave portion 4e of the front surface of the optical housing 4, movement of the optical housing 4 in the second optical axis O2 direction is restricted to some extent. Meanwhile, in order to allow movement of the optical housing 4 in the direction along the second optical axis O2 (the direction along the X-axis) thereby to avoid interference of the optical housing 4 with the camera main body, the arrangement of the optical housing 4 with respect to the inner surface of the front cover member 2 is defined such that some amount of gap space is formed in the predetermined regions between both ends of the optical housing 4 in the direction of movement (the second optical axis direction) and the inner surface of the camera main body, that is, in the regions indicated by reference numerals A and B in FIG. 8.

The gap spaces A and B are set depending on various factors such as the resilient force determined by the material of the shock absorbing member 24, the shock absorbing ability in the shear direction, the weight of the optical housing 4, the weight of the camera 1 itself, and the amount of external force applied by shock or the like.

Here, as for the gap spaces A and B, sufficient length should be secured when the amount of movement of the optical housing 4 is considered, for example; however, if an unnecessarily large length of gap is secured by assuming a very large amount of shock force, for example, the requirement for reduction of the size of the camera main body cannot be met. Therefore, in designing, in consideration of reduction of the size of the device as well, the length of the gap spaces A and B in the order of about 1 mm, respectively, is secured, for example, in a small size camera or the like shown as an example in the present embodiment.

In addition to the above-described configuration, the shock absorbing member 24 may also be arranged between the rear side of the optical housing 4 and the plate form holding member 21.

As described above, according to the present embodiment, since the concave portion 4e in which the shock absorbing member 24 is mounted is formed by the frame portion 4f on the side of the optical housing 4, the shock absorbing member 24 is mounted in the concave portion 4e thereby to be positioned with respect to the optical housing 4, so that the position alignment at the time of mounting is facilitated and improvement of the efficiency of the assembly work can be achieved. The effects and advantages in other respects are similar to the second embodiment.

The present invention is not limited to the above-described embodiments; for example, the shock absorbing means may be a single body of the shock absorbing member 24, one surface of which is fixed by bonding or the like to at least one outer surface portion of the optical housing, and the other surface of which is fixed by bonding or the like to the inner surface of the containing portion 2x.

Of course, it is possible that various variations and applications of the present invention can be implemented in a scope not departing from the gist of the invention. Further, inventions of various stages are included in the above-described embodiments; various inventions can be extracted by appropriate combination of a plurality of constituent requirements disclosed. For example, when some constituent requirements are deleted from the entire constituent requirements shown in the embodiments, if a problem described in a section of problems to be solved by the invention can be solved and an advantage described in advantages of the invention can be obtained, a configuration with these constituent requirements deleted can be extracted as an invention.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A digital camera comprising:
   an optical housing having a generally flat shape, which includes an optical system for guiding an entering photographic object light to an image pickup device located on an optical axis and forming an optical image;
   a camera main body having a containing portion configured to contain the optical housing such that the optical housing can be displaced;
   a plate form holding member fixed to the camera main body from an opposite side of the containing portion of the optical housing so as to sandwich the optical housing contained in the containing portion of the camera main body between the holding member and an inner surface of the containing portion; and
   a shock absorbing section, one surface of which is fixed to an outer surface of the optical housing and the other surface of which is fixed to an inner surface side of the containing portion of the camera main body, the inner surface side facing an outer surface of the optical housing,
   wherein, when an external shock force is not applied to the camera main body, the optical housing is pressed by the plate form holding member in a direction of the inner surface of the containing portion with respect to the camera main body to thereby restrict movement of the optical housing, and
   when an external force is applied to the camera main body in a state where the optical housing is pressed by the plate form holding member in the direction of the inner surface of the containing portion and movement of the optical housing is restricted, the optical housing is displaced in the containing portion with respect to the camera main body and the plate form holding member by shear deformation of the shock absorbing section, to thereby absorb a shock to the optical housing by a shear force generated at the time of the displacement.

2. The digital camera according to claim 1, wherein the optical system is a bending optical system for reflecting a photographic object light entering along a first optical axis to a second optical axis direction perpendicular to the first optical axis, and when the optical housing is contained in the containing portion, the plate form holding member presses the optical housing in a direction perpendicular to the second optical axis direction and presses the optical housing against the inner surface of the containing portion, to thereby restrict the movement of the optical housing.

3. The digital camera according to claim 1, wherein the shock absorbing section includes a thin plate fixed to the inner surface of the containing portion of the camera main body, and a shock absorbing member fixed in a state of being sandwiched between the thin plate and the optical housing.

4. The digital camera according to claim 3, wherein the thin plate is formed with a notch portion in a peripheral portion, an engagement protrusion is formed at the containing portion of the camera main body, and the notch portion formed on the thin plate engages with the engagement protrusion of the containing portion of the camera main body to fix the thin plate with respect to the containing portion of the camera main body.

* * * * *